(12) United States Patent
Deveau et al.

(10) Patent No.: US 6,703,588 B2
(45) Date of Patent: Mar. 9, 2004

(54) COMPACT, THERMALLY STABILIZED HOUSING FOR PLANAR LIGHTGUIDE CIRCUITS

(75) Inventors: George F. Deveau, Cumming, GA (US); Francis A. Rotoloni, Duluth, GA (US)

(73) Assignee: Wavesplitter Technologies, Inc., Fremont, CA (US)

( * ) Notice: Subject to any disclaimer, the term of this patent is extended or adjusted under 35 U.S.C. 154(b) by 0 days.

(21) Appl. No.: 10/159,522

(22) Filed: May 31, 2002

(65) Prior Publication Data

US 2003/0222070 A1 Dec. 4, 2003

(51) Int. Cl.⁷ .................................................. F27D 11/00
(52) U.S. Cl. ..................... 219/385; 219/521; 219/209; 219/535; 219/536; 219/543; 219/548
(58) Field of Search ................................ 219/385, 386, 219/520, 521, 524, 530, 531, 209, 210, 535, 536, 543, 548; 385/12, 14, 49

(56) References Cited

U.S. PATENT DOCUMENTS

| | | | | |
|---|---|---|---|---|
| 3,883,715 A | * | 5/1975 | Gebo | 219/210 |
| 4,684,783 A | * | 8/1987 | Gore | 219/210 |
| 5,559,915 A | * | 9/1996 | Deveau | 385/49 |
| 5,708,741 A | * | 1/1998 | De Veau | 385/49 |
| 5,790,731 A | * | 8/1998 | Deveau | 385/49 |
| 5,919,383 A | * | 7/1999 | Beguin et al. | 219/209 |
| 5,994,679 A | | 11/1999 | DeVeau et al. | 219/530 |
| 6,008,475 A | * | 12/1999 | Aakalu et al. | 219/209 |
| 6,114,673 A | * | 9/2000 | Brewer et al. | 219/530 |
| 6,127,660 A | * | 10/2000 | Scafati | 219/209 |
| 6,127,663 A | * | 10/2000 | Jones | 219/209 |
| 6,192,169 B1 | * | 2/2001 | Cammons et al. | 385/14 |
| 6,330,152 B1 | * | 12/2001 | Vos et al. | 219/209 |
| 6,486,440 B1 | * | 11/2002 | Crafts et al. | 219/209 |

* cited by examiner

Primary Examiner—Sang Y. Paik
Assistant Examiner—Fadi H. Dahbour
(74) Attorney, Agent, or Firm—Mayer Fortkort & Williams, PC; Stuart H. Mayer, Esq.

(57) ABSTRACT

A housing is provided for maintaining a planar lightguide circuit at a temperature within a predetermined temperature range independent of ambient temperature. The housing includes a planar heating arrangement supporting and in thermal contact with the planar lightguide circuit. Also included is a frame assembly having a first surface on which the planar heating arrangement is fixed. The frame assembly has at least one opening through which extends at least one optical fiber coupled to the planar lightguide circuit. An overmold, which is molded around the frame assembly, includes at least one strain relief member through which the optical fiber extends.

33 Claims, 3 Drawing Sheets

INTEGRAL FIBER, FIBER-RIBBON AND ELECTRICAL CABLE STRAIN RELIEFS

COMPACT, THERMALLY STABILIZED HOUSING FOR PLANAR LIGHTGUIDE CIRCUITS

FIELD OF THE INVENTION

The present invention relates to housings for planar lightguide circuits and, more particularly, to a thermal housing having temperature control for maintaining a planar lightguide circuit within a fixed temperature range.

BACKGROUND OF THE INVENTION

Optical wavelength division multiplexing (WDM) and dense wavelength division multiplexing (DWDM) have gradually become the standard backbone networks for fiber optic transmission systems. WDM and DWDM systems employ signals consisting of a number of different wavelength optical signals, known as carrier signals or channels, to transmit information on optical fibers. Each carrier signal is modulated by one or more information signals. As a result, a significant number of information signals may be transmitted over a single optical fiber using WDM and DWDM technology.

WDM optical transmission systems employ a variety of different passive components. Such components are increasingly being fabricated on Planar Light-Guide Circuits (PLC). A planar lightguide circuit, also known as an optical integrated circuit, can be readily mass produced because the processing steps are compatible with those used in silicon integrated circuit (IC) technology, which are well known and geared for mass production. One common type of planar lightguide circuit employs doped-silica waveguides fabricated with silicon optical bench technology. Doped-silica waveguides are usually preferred because they have a number of attractive properties including low cost, low loss, low birefringence, stability, and compatibility for coupling to fiber. Such a planar lightguide circuit is fabricated on a carrier substrate, which typically comprises silicon or silica. The substrate serves as a mechanical support for the otherwise fragile lightguide circuit and it can, if desired, also play the role of the bottom portion of the cladding. In addition, it can serve as a fixture to which input and output fibers are attached so as to optically couple cores of an input/output fiber to the cores of the planar lightguide circuit. The fabrication process begins by depositing a base or lower cladding layer of low index silica on the carrier substrate (assuming the substrate itself is not used as the cladding layer). A layer of doped glass with a high refractive index, i.e., the core layer, is then deposited on top of the lower cladding layer. The core layer is subsequently patterned or sculpted into structures required by the optical circuits using photo-lithographic techniques similar to those used in integrated circuit fabrication. Lastly, a top cladding layer is deposited to cover the patterned waveguide core.

One important passive component that can be fabricated on a PLC is an arrayed waveguide grating (AWG) in which two multiport couplers are interconnected by an array of waveguides. AWGs have a variety of different uses and may serve, for example, as multiplexers, demultiplexers and static routers.

One of the problems arising from the use of some planar lightguide circuits such as an AWG is their sensitivity to temperature changes, and to physical stresses that impair their reliability. For example, in an AWG, because the operating wavelengths of the several individual channels differ by such a small degree, any expansion or contraction or bending due to temperature fluctuations will degrade the optical performance and, in the extreme, cause circuit failure. Likewise, temperature fluctuations less than 1° C. may cause degradation or failure. It has been found that degradation or failure can generally be prevented and reliability of the circuit insured if the temperature of the device is maintained at a predetermined temperature in a range of 75° C. to 90° C. This maintenance temperature, specific to the individual circuit, must be controlled to within a few degrees Celsius even though the ambient temperature may vary from, for example, 0° C. to 70° C. Thus, some sort of protective housing must be provided for the planar lightguide circuit.

Housings for maintaining optical components at a constant temperature are well-known. For example, U.S. Pat. No. 5,994,679 shows a housing that comprises a base and a snap-on cover made of a material having a relatively low thermal coefficient of expansion. Within the housing is a layer of fibrous material that is relatively immune to temperature changes. A pair of support members of the same material, but hardened, support a thermal bed, which comprises a substantially U-shaped aluminum member, the legs of which define a slot for receiving the AWG or other planar lightguide circuit. The slot is filled with a thermally conductive grease that suspends the AWG and allows it to float within the slot, substantially completely covered by the legs of the U-shaped bed. Thus, the AWG is in a stress free position in the slot. The thermal grease also increases the thermal conductivity between the thermal bed and the circuit and insures that the temperature is uniform over the entire circuit and that there are no hot spots. On the top surface of one or both legs of the U-shaped bed is a heater, a pair of resistive temperature devices for monitoring the temperature of the bed, and a temperature controller. Leads from the temperature controller pass through electrical lead through pins to the exterior of the housing to supply power to the heater.

One problem with the aforementioned housing is that it requires a relatively large number of components, thereby increasing the complexity and cost of its assembly. Moreover, the housing must be relatively thick to accommodate the U-shaped bed, which diminishes its attractiveness for space-limited applications, such as when the housing is to be mounted on a printed-circuit board.

Accordingly, it would be desirable to provide a housing for an optical component that maintains the component at a constant temperature and which is compact and simple to assemble.

SUMMARY OF THE INVENTION

In accordance with the present invention, a housing is provided for maintaining a planar lightguide circuit at a temperature within a predetermined temperature range independent of ambient temperature. The housing includes a planar heating arrangement supporting and in thermal contact with the planar lightguide circuit. Also included is a frame assembly having a first surface on which the planar heating arrangement is fixed. The frame assembly has at least one opening through which extends at least one optical fiber coupled to the planar lightguide circuit. An overmold, which is molded around the frame assembly, includes at least one strain relief member through which the optical fiber extends.

In accordance with one aspect of the invention, the planar heating arrangement includes a thermally conductive ceramic substrate and a resistive heating element disposed on a first side of the substrate. The planar lightguide circuit may be disposed on a second side of the substrate.

In accordance with another aspect of the invention, the ceramic substrate is formed from aluminum-nitride.

In accordance with yet another aspect of the invention, an elastometric thermal interface pad is provided, which has a first surface in contact with the planar heating arrangement and a second surface in contact with the planar lightguide circuit.

In accordance with another aspect of the invention, the planar lightguide circuit and the substrate have substantially similar temperature coefficient of expansions.

In accordance with another aspect of the invention, the frame assembly includes a frame member and base and cover members secured to one another in an air tight, water resistant manner.

In accordance with yet another aspect of the invention, the strain relief member is integrally formed with the overmold and is configured as a tapered collar surrounding the optical fiber extending therethrough.

DETAILED DESCRIPTION

Figure 1:
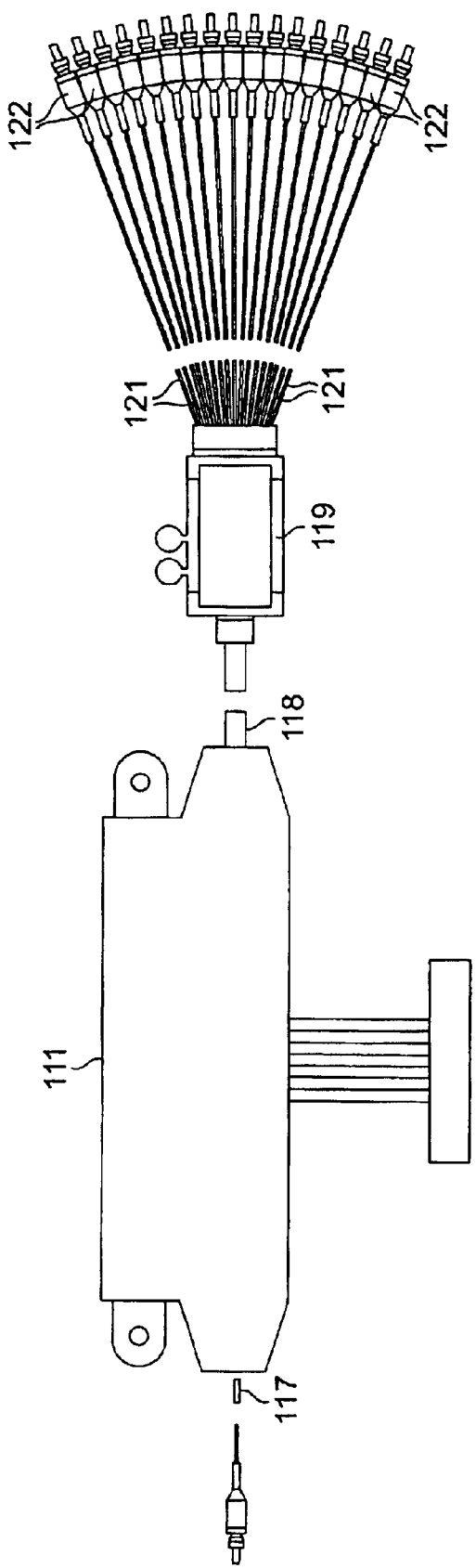
FIG. 1 shows a thermally stabilized housing for a planar lightguide circuit constructed in accordance with the present invention.

FIG. 1 depicts the housing 111 of the present invention as used to house a AWG or other planar lightguide circuit. An input buffered or insulated fiber 117 passes into the housing 111 for carrying optical signals to the AWG within the housing 111. The signal output of the AWG exits housing 111 in a fiber ribbon 118, wherein each fiber in the ribbon carries signals of one specific frequency. The ribbon 118 passes into a transition piece 119 wherein each fiber in the ribbon 118 is broken out and exits piece 119 in the form of a single insulated fiber 121, each having a terminating jack plug 122 at its end. In operation, input fiber 117 carries a combination of signals having different wavelengths, and the AWG within the housing separates the signals by wavelength and applies them to the individual output fibers in ribbon 118. Thus, each of the fibers 121 carries signals of a different wavelength from any of the other fibers. These wavelengths are typically quite closely spaced. For example, in an eight channel arrangement, the wavelengths maybe 1549.4 nm, 1551.0 nm, 1552.6 nm, 1554.2, 1555.9 nm, 1557.5 nm, 1559.1 nm, and 1560.7 nm. It can be seen that the successive wavelengths increase by only 1.6 nm approximately, a very small incremented difference. Spacings in 32 and 64 channel AWG are as small as 0.4 nm.

Figure 2:
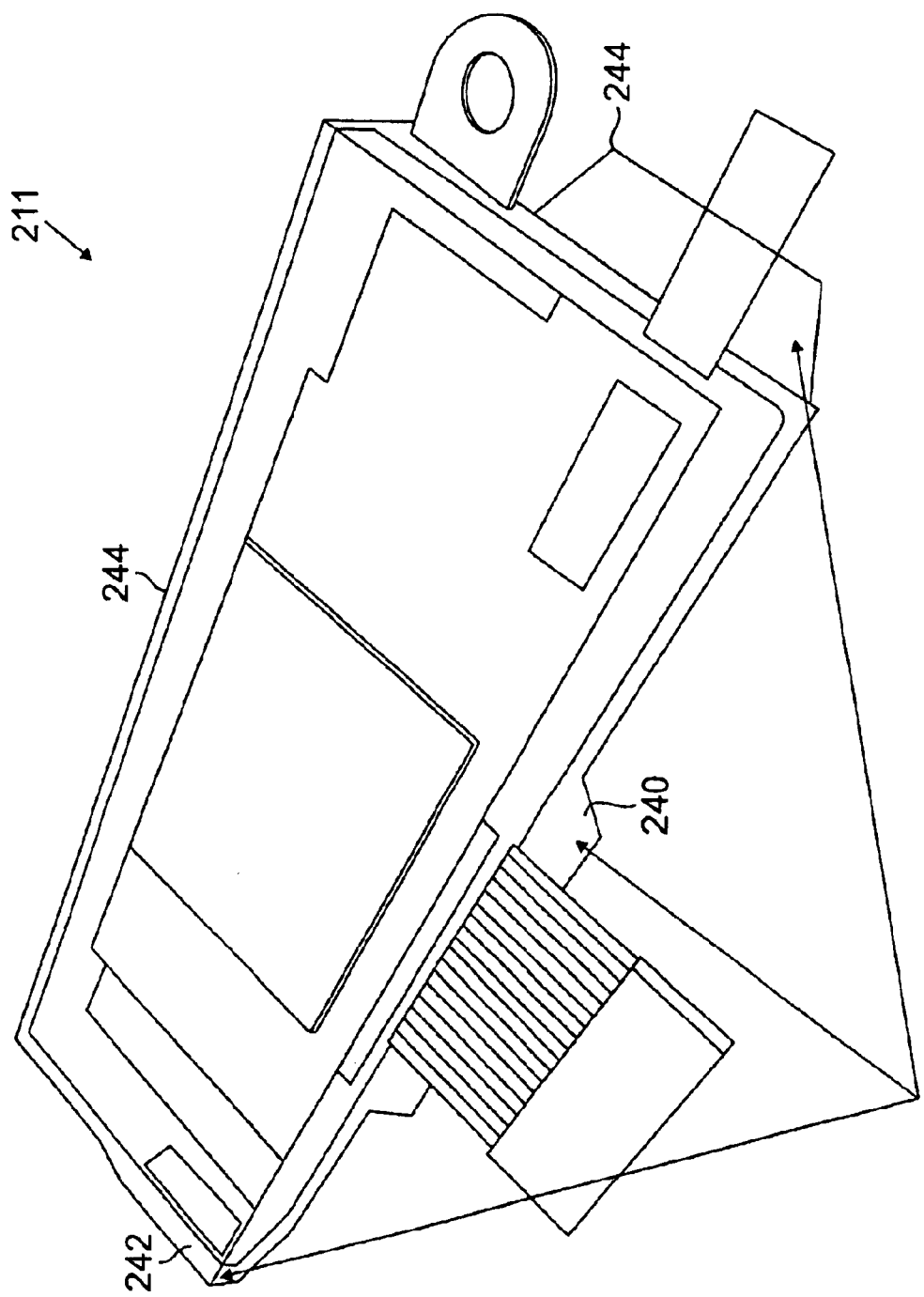
FIG. 2 is a top perspective view.
Figure 3:
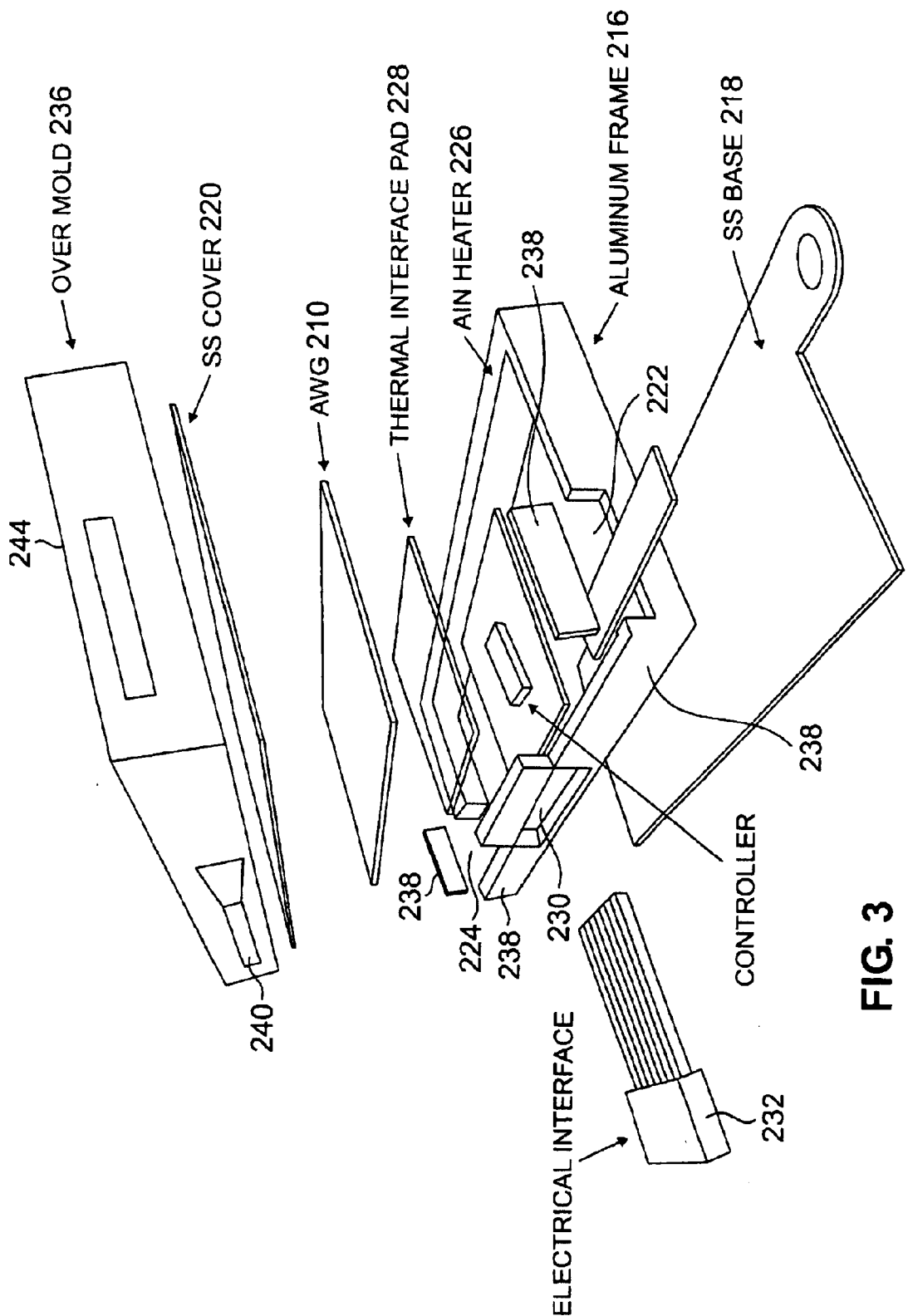
FIG. 3 is an exploded perspective view of the housing shown in FIG. 1.

FIG. 2 is a top perspective view and FIG. 3 is an exploded perspective view of the housing 211 and the components contained therein. As shown, AWG 210 is located in a framed assembly that comprises aluminum frame 216, stainless-steel base 218 and stainless-steel cover 220. A first sidewall of frame 216 includes an opening or cutout 222 through which the fiber ribbon exits the frame assembly. Likewise, a second sidewall of the frame 216 opposing the first sidewall of the frame 216 includes an opening or cutout 224 through which the input fiber exits the frame assembly. A third sidewall of the frame 216 connecting the first and second sidewalls contains an opening or cutout 230 through which an electrical interface or pins 232 extend. The electrical interface provides power and control signals to an internal temperature controller, which is described below.

AWG 210 is mounted on a planar heating arrangement such as an aluminum nitride (AlN) heater 226. AlN heater 226 includes an AlN substrate, which is a thermally conductive ceramic that has a low temperature coefficient of expansion that is similar to the temperature coefficient of expansion of the silica-based AWG 210. In this way stress between the AWG 210 and the AlN heater 226, which can arise from temperature fluctuations, is minimized. A serpentine heater element is screen printed on one side of the substrate using a thick film process. The AWG 210 is mounted on the side of the substrate opposite the heating element. A temperature sensor such as a thermistor or an RTD is also mounted on the side of the substrate on which the heater element is located to provide feedback information to a temperature controller. The temperature controller is also mounted on the side of the substrate on which the heater element is located. In some cases the temperature sensor may be located internal to the temperature controller. AlN heaters that include an integrated temperature controller are commercially available from ThermOptics™ Inc., for example.

A thermal interface pad 228 is disposed between the AWG 210 and the surface of the AlN heater 226. The thermal interface pad 228 is formed from an elastometric material such as a thermoplastic film filled with AlN particles, which is coated with an adhesive, and serves to provide good heat transfer between the AWG 210 and the AlN heater 226. A suitable thermal interface pad 228 is available, for example, from Melcor, Inc. The thermal interface pad 228 preferably has a temperature coefficient of expansion that is similar to that of the AWG 228 and the AlN 226. The elasticity of the thermal interface pad 228 may facilitate a reduction in stress that may arise between any mismatch in the temperature coefficient of expansion of the AWG 228 and the AlN heater 226.

The frame assembly is assembled in the following manner. Stainless-steel base 218 is fixed to the aluminum frame by any appropriate means such as with an adhesive, for example. In addition, the AWG 210, thermal interface pad 228 and AlN heater 226 are secured to one another with tape or adhesive. In some cases the thermal interface pad 228 may be supplied with a pressure-sensitive adhesive for mounting the pad to the AlN heater 226. Next, the AlN heater 226 is secured to the stainless-steel base 218. In particular, the side of the AlN substrate on which the heater element and controller are located is secured to the stainless-steel base 218 with, for example, double-sided tape that has a thickness in excess of the thickness of the temperature controller. Finally, the frame assembly is completed by securing the stainless-steel cover 220 to the aluminum frame by any appropriate means such as with an adhesive, for example. Prior to securing the stainless-steel cover 220 to the frame 216, the openings 222, 224, and 230 may be filled with foam rubber 238 to eliminate the gaps between the input fiber, fiber ribbon, electrical interface 232 and the respective cutouts through which they extend.

The frame assembly preferably forms an air tight, water resistant package to protect its internal components. This may be achieved by sealing any voids on the exterior surface of the assembly which may exist between the frame 216, base 218, cover 220, the electrical interface 232 extending through cutout 230, the input fiber extending through cutout 224, and the fiber ribbon extending through cutout 222. These voids may be filled with an adhesive such as a fast setting epoxy. Depending on the design specifications that the final device must meet, in some embodiments of the invention it may be desirable for the frame assembly to form a hermetic seal. The hermetic seal may be achieved by providing additional sealing means that are known to those of ordinary skill in the art.

The frame assembly undergoes a molding process in which an overmold is formed around the frame assembly. As seen in the figures, the overmold includes integrally formed strain relief elements through which the input fiber, fiber ribbon and electrical interface 232 respectively extend. The strain relief elements 240, 242 and 244, which are respectively aligned with the cutouts 230, 224, and 222 in the frame 216, are protuberances that taper inward as they extend away from the frame assembly, thus each forming a collar about each of the fiber, fiber ribbon and electrical interface to reduce damage that could arise from tension exerted on them. The molding material that forms the overmold may be any material that has a sufficient degree of durability and softness to protect and cushion the internal components. Exemplary materials that may be employed include, for example, urethanes, polymers, and silicone.

Although various embodiments are specifically illustrated and described herein, it will be appreciated that modifications and variations of the present invention are covered by the above teachings and are within the purview of the appended claims without departing from the spirit and intended scope of the invention. For example, while housing in accordance with the present invention has been described in terms of housing an AWG, the housing more generally may be employed to housed any planar lightguide circuit. Moreover, the invention is not limited to the particular materials and geometric configurations depicted herein.

What is claimed is:

1. A housing for maintaining a plannar lightguide curcuit at a temperature within a predetermined temperature range independent of ambient temperature, said housing comprising:

a planar heating arrangement supporting and in thermal contact with the planar lightguide circuit;

a frame assembly having a first surface on which the planar heating arrangement is fixed, said frame assembly having at least one opening through which extends at least one optical fiber coupled to the planar lightguide circuit; and an overmold molded around the frame assembly, said overmold including at least one strain relief member through which the at least one optical fiber extends, wherein said planar heating arrangement includes a thermally conductive ceramic substrate and a resistive heating element disposed on a first side of the substrate, said planar lightguide circuit being disposed on a second side of the substrate.

2. The housing of claim 1 wherein said ceramic substrate is formed from aluminumr-nitride.

3. The housing of claim 1 wherein said resistive heating element is a resistive film formed on the first side of the substrate.

4. The housing of claim 1 wherein said resistive heating element is a resistive film formed on the first side of the substrate.

5. The housing of claim 4 wherein said resistive film extends over the substrate in a serpentine manner.

6. The housing of claim 1 wherein said planar heating arrangement includes a temperature controller disposed on the first side of the substrate.

7. The housing of claim 1 wherein said planar heating arrangement includes a temperature sensor disposed on the substrate.

8. The housing of claim 6 wherein said planar heating arrangement includes a temperature sensor disposed on the first side of the substrate.

9. The housing of claim 1 further comprising an elastometric thermal interface pad having a first surface in contact with the planar heating arrangement and a second surface in contact with the planar lightguide circuit.

10. The housing of claim 1 wherein said plana lightguide circuit and said substrate have substantially similar temperature coefficient of expansions.

11. The housing of claim 1 wherein said frame assembly includes a frame member and base and cover members secured to one another in an air tight, water resistant manner.

12. The housing of claim 1 wherein said strain relief member is integrally formed with said overmold and is configured as a tapered collar surrounding the at least one optical fiber extending therethrough.

13. The housing of claim 1 wherein said planar lightguide circuit includes an arrayed waveguide grating.

14. The housing of claim 1 wherein said overmold is formed from silicone.

15. The housing of claim 1 wherein said frame assembly includes at least three opening through which respectively extend an input fiber, a fiber ribbon, and an electrical interface connected to the planar heating arrangement.

16. The housing of claim 15 wherein said overmold further includes at least three strain relief members through which the input fiber, fiber ribbon and the electrical interface respectively extend.

17. The housing of claim 9 further comprising an adhesive securing the thermal interface pad to the planar hearing arrangement and the thermal interface pad to the planar lightguide circuit.

18. A housing for maintaining a planar lightguide circuit at a temperature within a predetermined temperature range independent of ambient temperature, said housing comprising:

a planar heating arrangement supporting and in thermal contact with the planar lightguide circuit, wherein said planar heating arrangement includes a temperature controller;

a frame assembly having a first surface on which the planar heating arrangement is fixed, said frame assembly having at least one opening through which extends at least one optical fiber coupled to the planar lightguide circuit; and an overmold molded around the frame assembly, said overmold including at least one strain relief member through which the at least one optical fiber extends.

19. The housing of claim 18 wherein said planar heating arrangement includes a thermally conductive ceramic substrate and a resistive heating element disposed on a first side of the substrate, said planar lightguide circuit being disposed on a second side of the substrate.

20. The housing of claim 19 wherein said ceramic substrate is formed from aluminum-nitride.

21. The housing of claim 19 wherein said resistive heating element is a resistive film formed on the first side of the substrate.

22. The housing of claim 20 wherein said resistive heating element is a resistive film formed on the first side of the substrate.

23. The housing of claim 19 wherein said temperature controller is disposed on the first side of the substrate.

24. The housing of claim 18 further comprising an elastometric thermal interface pad having a first surface in contact with the planar heating arrangement and a second surface in contact with the planar lightguide circuit.

25. The housing of claim 19 wherein said planar lightguide circuit and said substrate have substantially similar temperature coefficient of expansions.

26. The housing of claim 18 wherein said frame assembly includes a frame member and base and cover members secured to one another in an air tight, water resistant manner.

27. The housing of claim 18 wherein said strain relief member is integrally formed with said overmold and is configured as a tapered collar surrounding the at least one optical fiber extending therethrough.

28. The housing of claim 18 wherein said planar lightguide circuit includes an arrayed waveguide grating.

29. The housing of claim 18 wherein said overmold is formed from silicone.

30. The housing of claim 18 wherein said frame assembly includes at least three opening through which respectively extend an input fiber, a fiber ribbon, and an electrical interface connected to the planar heating arrangement.

31. The housing of claim 30 wherein said overmold further includes at least three strain relief members through which the input fiber, fiber ribbon and the electrical interface respectively extend.

32. The housing of claim 24 further comprising an adhesive securing the thermal interface pad to the planar hearing arrangement and the thermal interface pad to the planar lightguide circuit.

33. The housing of claim 21 wherein said resistive film extends over the substrate in a serpentine manner.

* * * * *

UNITED STATES PATENT AND TRADEMARK OFFICE
CERTIFICATE OF CORRECTION

PATENT NO. : 6,703,588 B2
DATED : March 9, 2004
INVENTOR(S) : Deveau et al.

It is certified that error appears in the above-identified patent and that said Letters Patent is hereby corrected as shown below:

Column 2,
Line 11, change "0° C." to -- 0° C --.

Column 5,
Line 31, change "housed" to -- house --.
Line 35, change "plannar" to -- planar --.
Line 56, change "aluminumr" to -- aluminum --.

Column 6,
Line 11, change "plana" to -- planar --.
Line 26, change "opening" to -- openings --.
Line 34, change "hearing" to -- heating --.

Column 8,
Line 2, change "opening" to -- openings --.
Line 11, change "hearing" to -- heating --.

Signed and Sealed this

First Day of June, 2004

JON W. DUDAS
*Acting Director of the United States Patent and Trademark Office*